July 9, 1963 P. E. FISKE 3,097,348

SECURE COMMUNICATION SYSTEM

Filed Aug. 20, 1959 3 Sheets-Sheet 1

INVENTOR.
PAUL E. FISKE

BY

ATTORNEYS

INVENTOR.
PAUL E. FISKE
BY
ATTORNEYS

INVENTOR.
PAUL E. FISKE
BY
Paul A. Gitchelor
ATTORNEYS

United States Patent Office 3,097,348 Patented July 9, 1963

3,097,348

SECURE COMMUNICATION SYSTEM

Paul E. Fiske, 1059 Devonshire, San Diego, Calif.

Filed Aug. 20, 1959, Ser. No. 835,147
6 Claims. (Cl. 340—164)
(Granted under Title 35, U.S. Code (1952), sec. 266)

The invention described herein may be manufactured and used by or for the Government of the United States of America for governmental purposes without the payment of any royalties thereon or therefor.

This invention relates to a secure communication system and more particularly to a secure communication system utilizing non-synchronous coded pulses.

The prior art coded communication systems such as that exemplified by the patent issued to E. S. Purington, March 29, 1949, No. 2,465,925, utilizes two separate transmitters and two separate receivers for operation on different frequency channels for the necessary security. Such a system requires two complete communication systems for each channel of communications, and the excessive periods of transmission time may allow interception and jamming.

In an attempt to standardize the lengths of the dots and the dashes, various complex systems have been devised such as that exemplified by Patent No. 2,658,946, issued to J. Kaye on November 10, 1953. A system such as this is dependent upon either mechanical timing devices or the extremely complex electronic means necessary to achieve the standardization sought.

It is thus an object of the present invention to provide a secure communications system which is transmitting an extremely short period of time compared to the time of the message intelligence.

Another object is the provision of a secure communications system in which only one frequency is utilized for many channels of communications. Many channels may be put on the same frequency by proper coding.

A further object of the present invention is to provide a secure communications system which can utilize an existing operating radar equipment as the communications medium.

A still further object is the provision of a secure communications system in which the reception of a transmitted message is automatically monitored at the sending station.

Still another object of the present invention is to provide a secure communications system in which the distance of the receiving station from the transmitting station is indicated at the transmitting station.

Yet another object is the provision of a simple adjustable means for setting the duration and pitch of received code.

According to the invention, a first coded set of pulses are generated and transmitted each time a telegraph key is changed from one position to another, and a differently coded set of pulses are generated and transmitted each time the telegraph key is changed or moved to another position. Each coded set can correspond, for example, to a dot and a dash. At the received end, the sets of pulses are decoded, one set causing a tone to be generated for a predetermined time which, for example, can be for a dot, and another coded set causing a tone for a different predetermined time, which can be for a dash. The tones, of course, are connected to indicating equipment such as earphones or a recorder. In a second embodiment, the one coded set of pulses causes the tone generator to start in the receiver and a second coded set of pulses causes the tone generator to stop. This would be in line with the normal type of telegraph key operation, i.e., the key can actuate a relay, the forward contacts of which causing a first set of pulses to be generated, and the back contacts causing a second set of pulses to be generated. The pulses are of such a short width, in microseconds, that interception is rendered virtually impossible and operation with existing radar equipment becomes feasible since the keyed time is so short compared to the on time of a radar transmitter. Also, because of the non-synchronous time relationships, the transmitted and received pulses are not visible on radar indicators.

Another feature of the invention lies in automatic monitoring and ranging equipment associated with the pulse coding and decoding mechanism. The first transmitted pulse of a set is also coupled to a timer which can be of the digital type, for example, turning on a clock pulse counter. The received coded pulses at the receiving end can then be used to trigger a transmitter sending out one pulse which is received by the transmitting end and utilized to stop the timer. This can be calibrated to indicate the distance of the received station and also automatically monitors the reception of the received station.

Other objects and many of the attendant advantages will be readily appreciated as the same becomes better understood by reference to the following detailed description when considered in connection with the accompanying drawings in which like reference numerals designate like parts throughout the figures thereof and wherein.

Figure 1:
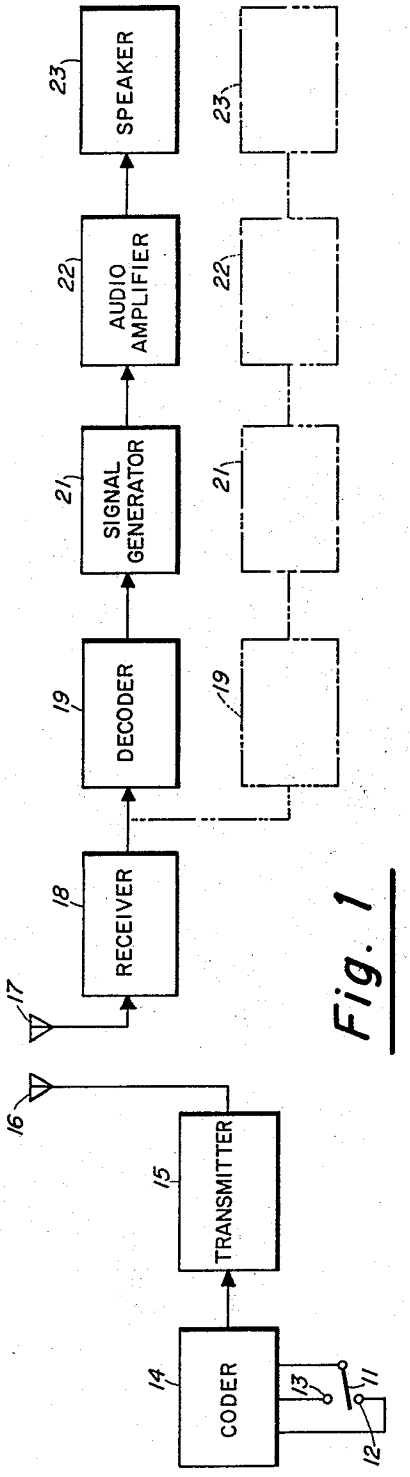
FIG. 1 is an overall system block diagram showing the basic communications system.

Referring now to the drawings as shown in FIG. 1, key 11 having contacts 12 and 13 is connected to coder 14, the output of which is connected to transmitter 15. The output of transmitter 15 is connected to antenna 16. Antenna 17 is connected to the input of receiver 18, the output of which is connected to decoder 19. Decoder 19 is connected to signal generator 21, which, in turn, is connected to audio-amplifier 22, the output of which is connected to indicating device 23.

Figure 2:
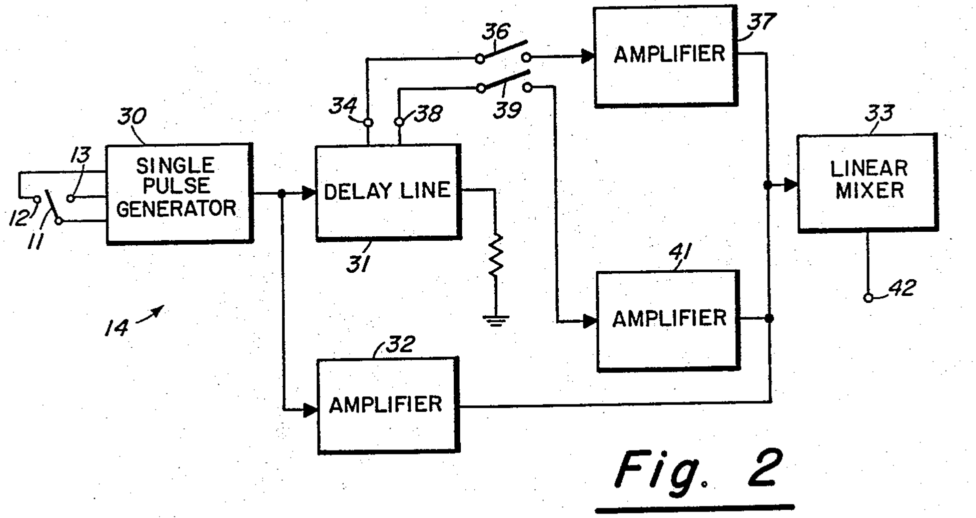
FIG. 2 is a block diagram of the coder component of FIG. 1.

In FIG. 2, the coder 14 of FIG. 1 is shown in a more detailed block diagram. Key 11 and contacts 12 and 13 are connected to single pulse generator 30, the output of which is connected to the input of delay line 31 and amplifier 32. The output of amplifier 32 is connected to the input of linear mixer 33. Output tap 34 is connected through switch 36 to amplifier 37. Output tap 38 is connected through switch 39 to amplifier 41. The outputs of amplifiers 37 and 41 are connected to linear mixer 33, the output of which is connected to terminal 42.

Figure 3:
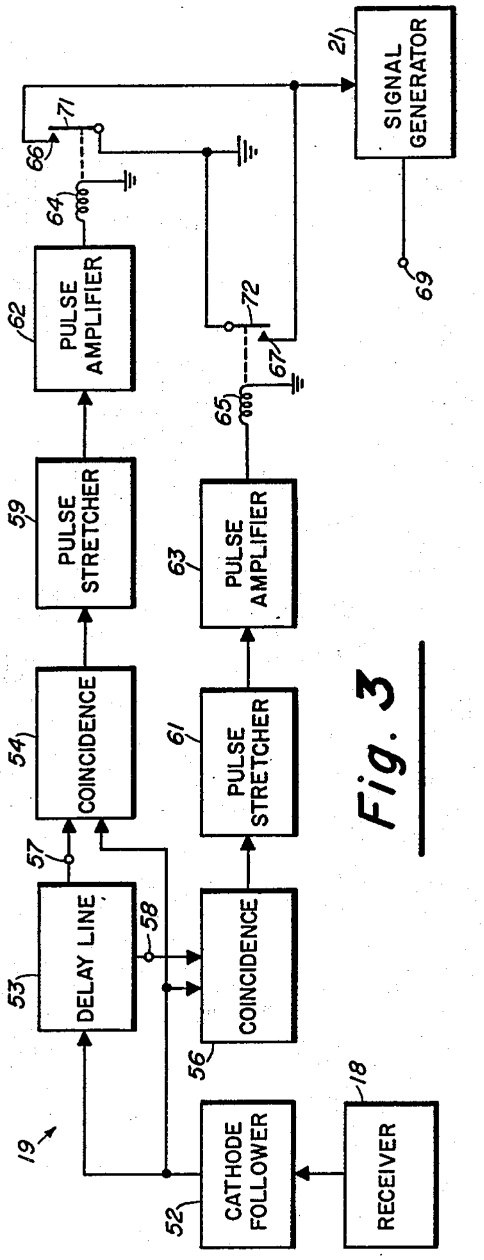
FIG. 3 is a block diagram of one embodiment of the decoder element of FIG. 1.

Referring to FIG. 3, the decoder of FIG. 1 is shown in greater detail. Receiver 18 is connected to cathode follower 52, the output of which is connected to the input of delay line 53 and coincidence circuits 54 and 56. Output taps 57 and 58 of delay line 53 are connected to coincidence circuits 54 and 56 respectively. The output of coincidence circuit 54 is connected to pulse stretcher 59, and the output of coincidence circuit 56 is connected to pulse stretcher 61. The output of pulse stretcher 59 is connected to amplifier 62, and the output of pulse stretcher 61 is connected to amplifier 63. The output of amplifier 62 is connected to solenoid winding 64 and the out- Contact 66 of solenoid 64 and contact 67 of solenoid 65 are connected to tone generator 21, the output of which is connected to indicator output terminal 69. Contact arms 71 of relay 64 and 72 of relay 65 are grounded.

Figure 4:
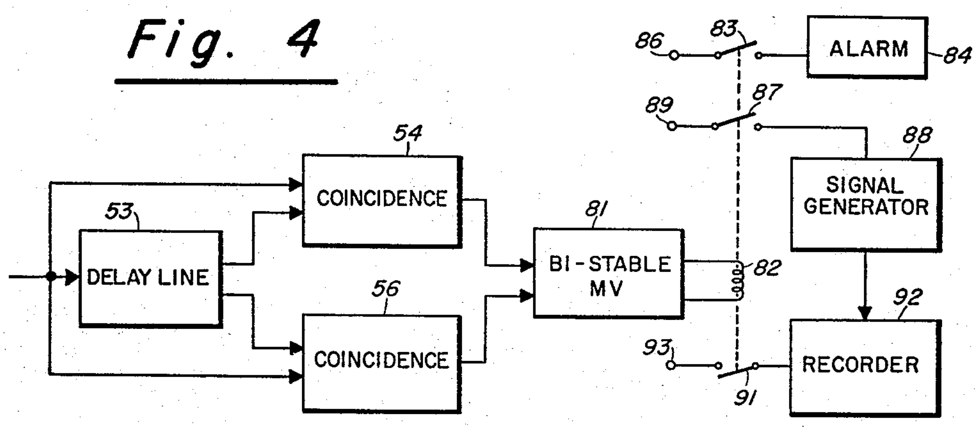
FIG. 4 is a block diagram of another embodiment of the decoder of FIG. 1.

Referring to FIG. 4, the outputs of coincidence circuits 54 and 56 are connected to bi-stable multivibrator 81, the output of which is connected to solenoid winding 82. Contact 83 of relay 82 connects alarm 84 to terminal 86, contact arm 87 connects tone oscillator 88 to terminal 89, and contact arm 91 connects recorder 92 to terminal 93.

Figure 5:
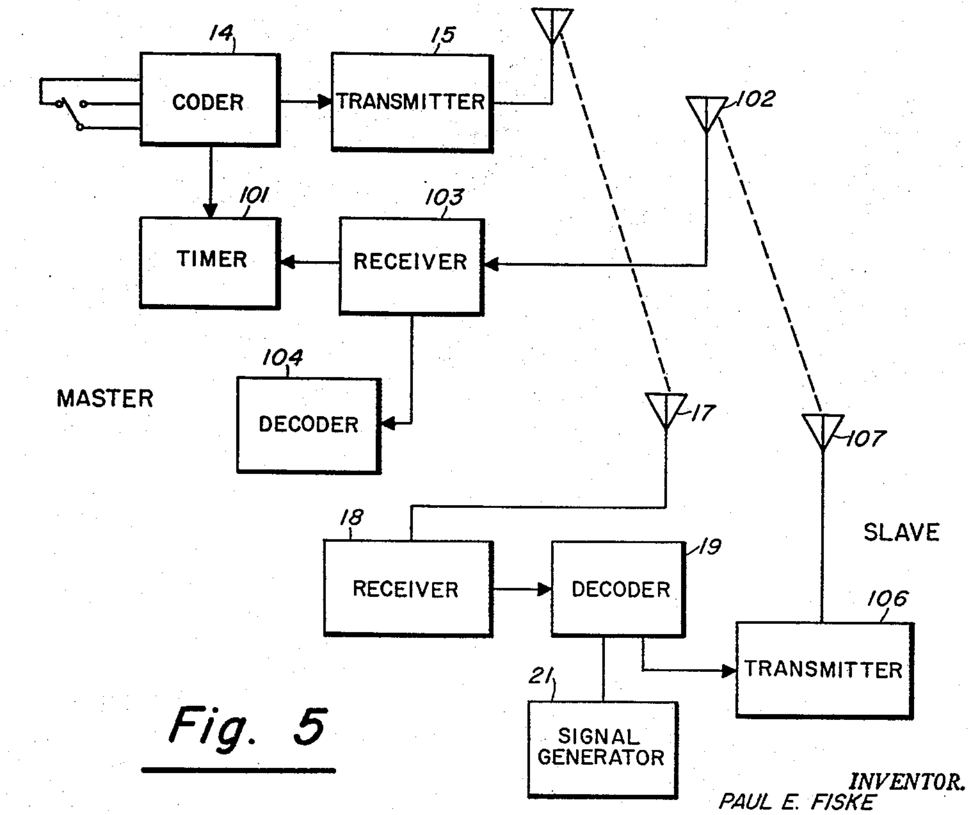
FIG. 5 is a block diagram of the ranging and verification system utilized in conjunction with the system of FIG. 1.

Referring to FIG. 5, transmitter coder 14 is connected to timer 101 and transmitter 15. Antenna 102 is connected to receiver 103, the outputs of which are connected to timer 101 and to decoder 104. Antenna 17 is connected to receiver 18, the output of which is connected to decoder 19. The output of decoder 19 is connected to transmitter 106, the output of which is connected to antenna 107. The output of decoder 19 is also connected to signal generator 21 as in FIG. 1.

*Operation*

Figure 6:
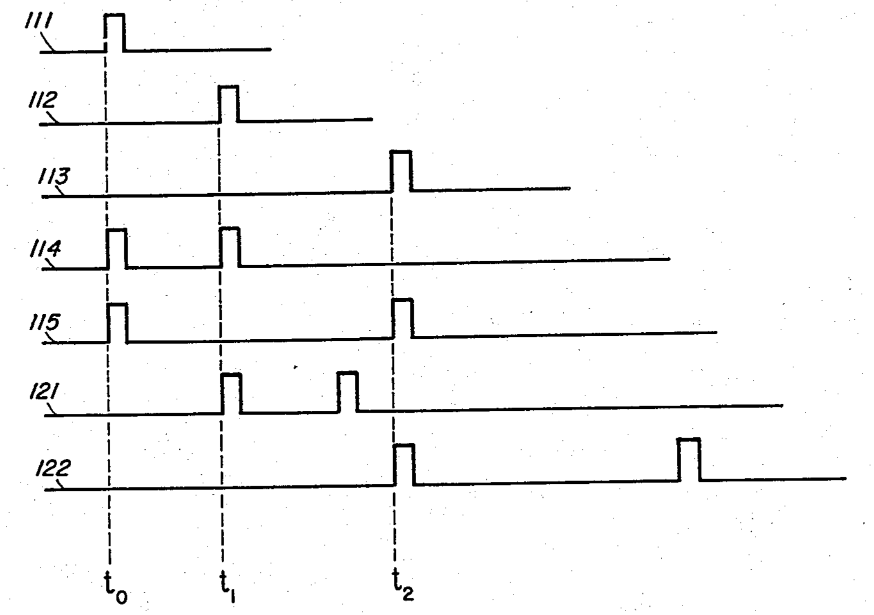
FIG. 6 shows the various waveforms present throughout FIGS. 1 through 5.

Referring again to FIG. 1, coder 14 produces two pulses shown at 114 of FIG. 6 when key 11 makes contact with contact 12 and produces pulses shown at 115 when thrown in the opposite position, in this case shown as contact 13. These pulses, either 114 or 115 are then utilized to modulate transmitter 15 which are propagated by way of antenna 16. At the receiving station the RF pulses are picked up by receiving antenna 17 and passed through receiver 18 which detects the two pulses. Receiver 18 is then coupled to decoder 19 which produces, in one embodiment, a dot or a dash pulse depending upon which code is used 114 or 115. The resultant dot or dash pulse is used to gate signal generator 21 resulting in an audible code being amplified in audio-amplifier 22 which is coupled to speaker 23. In a second embodiment, shown in FIG. 4, the pulses of RF modulated by code 114 of FIG. 6 cause an output from decoder 19 and the pulses shown at 115 of FIG. 6 are utilized to terminate the output from decoder 19. This would represent the normal operation of a telegraph key, the first embodiment representing a speed key type of operation.

Referring to FIG. 2, coder 14 is broken down in a more detailed block diagram. Key 11 initiates a pulse at single pulse generator 30 irrespective of which way it is thrown, i.e., single pulse generator 30 yields a single pulse output shown as waveform 111 at $t_0$ in FIG. 6 when key 11 is thrown to either contact 12 or 13. Switch 36 is actuated by closing contact arm 11 to contact 12 and switch 39 is actuated by closing contact arm 11 to contact 13. These can be either mechanically gauged or, in the preferred case, relay actuated. Since the actual control circuitry does not form a part of the invention it is not shown in the interest of simplicity and clarity. The output of single pulse generator 30 is amplified and isolated in amplifier 32 and coupled to an input of linear mixer 33. The pulse from single pulse generator 30 is also coupled to the input of delay line 31. Delay line 31 has two incremental output taps in the preferred embodiment, representing 4.75 microseconds of delay at output tap 34 and 9.5 microseconds of delay at output tap 38. In the case of key arm 11 making contact with contact 12 switch 36 is closed and switch 39 is open. Thus an output is taken 4.75 microseconds after the starting pulse to the input of amplifier 37. This is shown as waveform 112 at $t_1$ in FIG. 6. The output of amplifier 37 is then coupled to the input of linear mixer 33. Linear mixer 33 will then see at its input two pulses, pulse 111 and pulse 112, shown as waveform 114 delayed spaced at 4.75 microseconds. In the case where key 11 makes contact with contact 13 switch 39 is closed and switch 36 is opened resulting in a pulse input to amplifier 41 9.5 microseconds after the input pulse shown at 111. This input is shown singly at 113 resulting in a spaced pulse two pulse input to linear mixer 33 shown at 115 with a spacing of 9.5 microseconds, in the preferred embodiment.

The output of linear mixer 33 modulates transmitter 15 as explained with reference to FIG. 1.

Referring now to FIG. 3, decoder 19 of FIG. 1 is broken down in more detailed form. Starting from the output of receiver 18, isolating and impedance matching stage 52 couples the signal from receiver 18 to delay line 53. In the preferred embodiment this signal will be a pair of pulses separated by either 4.75 microseconds as illustrated by waveform 114 in FIG. 6 or separated by a period 9.5 microseconds as illustrated by waveform 115 of FIG. 6 taking $t_0$ as the reference time of reception. In the case of waveform 114 being received this will appear at one input of both coincidence circuits 54 and 56. A 4.75 microseconds delay tap is taken at terminal 57 which is applied to coincidence circuit 54. Both pulses will then be delayed by a period of 4.5 microseconds as illustrated at waveform 121 of FIG. 6. It can be seen then that the first pulse from tap 57 will be in coincidence with the second pulse taken directly from cathode follower 52, and an output will be yielded from coincidence circuit 54 at time $t_1$. The output from delay tape 58 is 9.5 microseconds delayed and in the case of waveform 114 being applied to the input there will be no pulses in coincidence applied to the input of coincidence circuit 56. Thus coincidence circuit 56 will not yield an output when code 114 is being received. When code 115 is being received, the converse is true, i.e., pulses delayed by 4.75 microseconds at tap 57 will not be in coincidence with the second input pulse 115 and coincidence circuit 54 will not yield an output. The 9.5 microseconds delay tap 58 however will yield an output shown at 122 which is the 115 input waveform delayed by 9.5 microseconds. It is thus obvious that at time $t_2$ the first pulse appearing at the 9.5 microseconds delay tap 58 will be in coincidence with the second pulse received at the input of delay line 53 and applied to coincidence circuit 56. Coincidence circuit 56 will then yield a single pulse output at a time $t_2$, 9.5 microseconds after the initial pulse of 115 is received. The outputs from coincidence circuits 54 and 56 are passed through pulse stretchers 59 and 61 respectively and pulse amplifiers 62 and 63 respectively to actuate either relay 64 or 65. Relays 64 and 65 will actuate contacts 71 or 72 either of which key tone generator 21. It will be obvious at this point that by adjusting, for example, pulse stretcher 59 a typical dot signal can be produced and by adjusting the pulse stretcher 61 a typical dash signal can be produced, resulting in a normal code type of operation.

Referring now to FIG. 4, a modification of the decoder is shown which with the exception of a normal single pole key (not shown), is identical with the FIG. 3 embodiment up to the output of coincidence circuits 54 and 56. As pointed out previously, a normal key can be utilized to energize a relay, the forward contacts of which causing code 114 to be generated, and the back contacts of which causing code 115 to be generated. The difference here being that instead of feeding pulse stretchers the outputs are utilized to trigger a single bistable multivibrator 81 from one stable condition to the other which is utilized to energize relay winding 82. Thus, for example, when an output is yielded at coincidence circuit 54 triggering bi-stable multivibrator into one stable position, relay winding 82 is energized, starting tone oscillator 88 through contact 87, alarm 84 through contact arm 83, and, if desired, recorder 92 through contact arm 91. Since bistable multivibrator 81 will remain in this position until a signal is seen from coincidence circuit 56, the tone oscillator will be gated on from the time of reception of code 114, which will start the tone oscillator, to the time of reception of code 115, which, in this embodiment, is utilized to stop the tone oscillator by de-actuating relay 82.

Referring now to FIG. 5 a ranging and verification system is shown which can be utilized with the communication system described above in order to determine positively that a message has been received and, in the case of mobile stations, determine the range or distance between the transmitting station and receiving station. The output of coder 14 is also fed to a timer 101 to start a timing count; timer 101 can be any of the conventional digital clock type pulse counters. At the receiving station an output is taken from decoder 19 and utilized to pulse modulate a transmitter shown at 106. Transmitter 106 will then broadcast a short burst of energy through antenna 107 which is received by receiving antenna 102 back at the receiving station. This energy is then fed through receiver 103 and into its decoder, assuming a two-way system identical at each end. A pulse from receiver 103 is also fed into timer 101, which, in the case a digital counter is utilized, is utilized to stop the counting. The timer 101 can then be calibrated in yards or miles depending on the accuracy desired, which will be directly proportional to the time between pulses from coder 14 and receiver 103. Obviously this will indicate both the range or distance to the receiving station and verify the fact that the signal has been received and decoded at the receiving station.

In the preferred embodiment this system, i.e., the coding and decoding, has been utilized in conjunction with existing radar equipment. It has been found that, since the transmission and reception of the communications pulses are extremely short and not synchronized with the radar equipment, the radar equipment will not interfere with communications and, conversely, the communications will not interfere with the normal operation of the radar equipment, i.e., the radar can be operated simultaneously with the communications equipment. Either the radar antenna system or a separate antenna system can be utilized in conjunction with the communications equipment, depending upon the type of operation desired. It has been found that all radar transmitters in existence are designed to handle considerably more than 0.000075 percent additional duty cycle required for the communications system. While a single channel system has been described, obviously a plurality of channels can be utilized in conjunction with one transmitter and receiver. It is only necessary to provide as many coders and decoders as there are channels, each having a different coded pulse spacing. Also the radar receivers inherently provide the bandwidth and pulse fidelity required with this communication system. Since the video from the radar equipment is random, the chances are practically nil of ever receiving the video signals in the proper sequence to be decoded by the communications system. Even if this should happen it would only result in a spurious dot or dash.

Thus, the preferred embodiment provides a communication system which is almost impossible to intercept and provide jamming opportunities of even a smaller likelihood, along with a simple means of standardizing code pulse lengths and ranging on the receiving station.

While a system has been described in conjunction with radar equipment it is obviously adaptable to any communications equipment by modifying where necessary the pulse width, pulse spacing and possibly bandwidth parameters of the described system.

Obviously many modifications and variations of the present invention are possible in the light of the above teachings. It is therefore to be understood that within the scope of the appended claims the invention may be practiced otherwise than as specifically described.

What is claimed is:

1. A secure communication system comprising pulse generating means for generating at least two sets of a plurality of pairs of pulses, the pairs of pulses of each of said sets having a different predetermined timed relationship with respect to each other, each of said plurality of pairs of pulses adapted to modulate a transmitter carrier signal, a decoder comprising a plurality of selecting circuits, each of said selecting circuits responsive to a different one of said sets of pulses when detected by suitable receiving means, pulse shaping means connected to the outputs of said selecting circuits, and indicating means connected to the output of said pulse shaping means.

2. The system of claim 1 wherein said pulse generating means comprises a single pulse generator, a two-position key, pulse time delaying means having a plurality of incremental time delay outputs, circuit means interconnecting said key with said pulse generator whereby said pulse generator yields a single output pulse upon the changing of said key from either one of said two-positions to the other, the output of said pulse generator connected to the input of said delay line and one input of a linear mixer, selecting means for connecting one of said delaying means output taps to another input of said linear mixer, said selecting means responsive to said key whereby a different output tap is selected for each different position of said key, and the output of said linear mixer adapted to modulate a transmitter carrier signal.

3. The system of claim 2 wherein said selecting circuits comprise a pulse time delaying means having a plurality of incremental time delay outputs, each of said time delay outputs having a time delay equal to the predetermined timed relationship of a different one of said sets of pairs of pulses, a plurality of coincidence circuits each having one input connected to the input of said pulse time delaying means and another input connected to a different one of said output taps, and the outputs of said coincidence circuits connected to said pulse shaping means.

4. The system of claim 1 wherein said selecting circuits comprise a pulse time delaying means having a plurality of incremental time delay outputs, each of said time delay outputs having a time delay equal to the predetermined timed relationship of a different one of said sets of pulses, a plurality of coincidence circuits each having one input connected to the input of said pulse time delaying means and another input connected to a different one of said output taps, and the outputs of said coincidence circuits connected to said pulse shaping means.

5. The secure communications system of claim 1 wherein said pulse shaping means comprises a separate variable pulse stretcher connected to the output of each selecting circuit, said indicating means being responsive to the output of any of said selecting circuits.

6. The secure communications system of claim 1 wherein said pulse shaping means comprises a bi-stable multivibrator responsive to the outputs of two of said selecting circuits, said indicating means being responsive to one condition of said bi-stable multivibrator.

References Cited in the file of this patent

UNITED STATES PATENTS

| | | |
|---|---|---|
| 2,433,047 | Tahon | Dec. 30, 1947 |
| 2,604,622 | Hasbrook | July 22, 1952 |
| 2,753,553 | Dodington | July 3, 1956 |
| 2,779,933 | Bradburd | Jan. 29, 1957 |